US007739480B2

(12) United States Patent
Liao et al.

(10) Patent No.: US 7,739,480 B2
(45) Date of Patent: Jun. 15, 2010

(54) METHOD AND APPARATUS FOR OBTAINING A SCALAR VALUE DIRECTLY FROM A VECTOR REGISTER

(75) Inventors: Yu-Chung C. Liao, Austin, TX (US); Peter A. Sandon, Essex Junction, VT (US); Howard Cheng, Sammamish, WA (US); Timothy J. Van Hook, Atherton, CA (US)

(73) Assignee: Nintendo Co., Ltd., Kyoto (JP)

( * ) Notice: Subject to any disclaimer, the term of this patent is extended or adjusted under 35 U.S.C. 154(b) by 1353 days.

(21) Appl. No.: 11/032,055

(22) Filed: Jan. 11, 2005

(65) Prior Publication Data

US 2005/0125630 A1    Jun. 9, 2005

Related U.S. Application Data

(63) Continuation of application No. 09/545,182, filed on Apr. 7, 2000, now Pat. No. 6,857,061.

(51) Int. Cl.
*G06F 15/76* (2006.01)
(52) U.S. Cl. ............... 712/3; 712/5; 712/4; 712/E9.017
(58) Field of Classification Search ............ 712/3, 712/4, E9.017, 5, 7
See application file for complete search history.

(56) References Cited

U.S. PATENT DOCUMENTS

| 4,541,046 A | | 9/1985 | Nagashima et al. |
| 4,713,748 A | * | 12/1987 | Magar et al. ............ 712/225 |
| 4,841,438 A | | 6/1989 | Yoshida et al. |
| 4,875,161 A | * | 10/1989 | Lahti ..................... 711/157 |
| 4,881,168 A | | 11/1989 | Inagami et al. |
| 4,890,220 A | * | 12/1989 | Nakagawa et al. ......... 712/8 |
| 4,933,839 A | * | 6/1990 | Kinoshita et al. ......... 712/8 |
| 5,073,970 A | | 12/1991 | Aoyama et al. |
| 5,201,058 A | | 4/1993 | Kinoshita et al. |
| 5,226,171 A | | 7/1993 | Hall et al. |
| 5,247,691 A | | 9/1993 | Sakai |
| 5,255,382 A | | 10/1993 | Pawloski |
| 5,261,113 A | | 11/1993 | Jouppi |

(Continued)

OTHER PUBLICATIONS

"Compiling collection-oriented languages onto massively parallel computers" Blelloch, Guy E. and Sabot, Gary W. (1988). Publisher: IEEE, pp. 575-585.*

(Continued)

*Primary Examiner*—Eddie P Chan
*Assistant Examiner*—Idriss N Alrobaye
(74) *Attorney, Agent, or Firm*—Nixon & Vanderhye, P.C.

(57) ABSTRACT

A method and apparatus for obtaining a scalar value from a vector register for use in a mixed vector and scalar instruction, including providing a vector in a vector register file, and embedding a location identifier of the scalar value within the vector in the bits defining the mixed vector and scalar instruction. The scalar value can be used directly from the vector register without the need to load the scalar to a scalar register prior to executing the instruction. The scalar location identifier may be embedded in the secondary op code of the instruction, or the instruction may have dedicated bits for providing the location of the scalar within the vector.

13 Claims, 5 Drawing Sheets

U.S. PATENT DOCUMENTS

| | | | | |
|---|---|---|---|---|
| 5,299,320 A | | 3/1994 | Aono et al. | |
| 5,418,973 A | | 5/1995 | Ellis et al. | |
| 5,423,051 A | | 6/1995 | Fuller et al. | |
| 5,426,754 A | | 6/1995 | Grice et al. | |
| 5,430,884 A | | 7/1995 | Beard et al. | |
| 5,510,934 A | | 4/1996 | Brennan et al. | |
| 5,513,366 A | | 4/1996 | Agarwal et al. | |
| 5,517,666 A | | 5/1996 | Ohtani et al. | |
| 5,526,504 A | | 6/1996 | Hsu et al. | |
| 5,530,881 A | | 6/1996 | Inagami et al. | |
| 5,537,538 A | | 7/1996 | Bratt et al. | |
| 5,537,606 A | | 7/1996 | Byrne | |
| 5,561,808 A | | 10/1996 | Kuma et al. | |
| 5,572,704 A | | 11/1996 | Bratt et al. | |
| 5,574,924 A | | 11/1996 | Yoshinaga et al. | |
| 5,604,909 A | | 2/1997 | Joshi et al. | |
| 5,625,834 A | | 4/1997 | Nishikawa | |
| 5,632,025 A | | 5/1997 | Bratt et al. | |
| 5,638,500 A | | 6/1997 | Donovan et al. | |
| 5,659,706 A | * | 8/1997 | Beard et al. | 711/125 |
| 5,669,013 A | | 9/1997 | Watanabe et al. | |
| 5,673,407 A | | 9/1997 | Poland et al. | |
| 5,689,653 A | | 11/1997 | Karp et al. | |
| 5,734,874 A | | 3/1998 | Van Hook et al. | |
| 5,740,402 A | | 4/1998 | Bratt et al. | |
| 5,742,277 A | | 4/1998 | Gossett et al. | |
| 5,742,842 A | | 4/1998 | Suetake et al. | |
| 5,805,875 A | * | 9/1998 | Asanovic | 712/222 |
| 5,812,147 A | | 9/1998 | Van Hook et al. | |
| 5,838,984 A | * | 11/1998 | Nguyen et al. | 712/5 |
| 5,848,286 A | | 12/1998 | Schiffleger et al. | |
| 5,864,703 A | | 1/1999 | Van Hook et al. | |
| 5,884,070 A | | 3/1999 | Panwar | |
| 5,898,882 A | | 4/1999 | Kahle et al. | |
| 5,931,945 A | | 8/1999 | Yung et al. | |
| 5,933,157 A | | 8/1999 | Van Hook et al. | |
| 5,933,650 A | | 8/1999 | Van Hook et al. | |
| 5,938,756 A | | 8/1999 | Van Hook et al. | |
| 5,946,496 A | | 8/1999 | Sugumar et al. | |
| 5,954,815 A | | 9/1999 | Joshi et al. | |
| 5,982,939 A | | 11/1999 | Van Hook | |
| 5,991,531 A | * | 11/1999 | Song et al. | 703/26 |
| 6,006,315 A | | 12/1999 | Park | |
| 6,016,395 A | * | 1/2000 | Mohamed | 717/149 |
| 6,058,465 A | | 5/2000 | Nguyen | |
| 6,075,906 A | | 6/2000 | Fenwick et al. | |
| 6,098,162 A | | 8/2000 | Schiffleger et al. | |
| 6,105,129 A | | 8/2000 | Meier et al. | |
| 6,141,673 A | | 10/2000 | Thayer et al. | |
| 6,166,748 A | | 12/2000 | Van Hook et al. | |
| 6,167,507 A | | 12/2000 | Mahalingaiah et al. | |
| 6,170,001 B1 | | 1/2001 | Hinds et al. | |
| 6,571,328 B2 | | 5/2003 | Liao | |
| 6,857,061 B1 | * | 2/2005 | Liao et al. | 712/222 |
| 7,213,131 B2 | * | 5/2007 | Hansen et al. | 712/220 |
| 2002/0130874 A1 | * | 9/2002 | Baldwin | 345/506 |

OTHER PUBLICATIONS

Intel "IA-64 Applicatoin Developers Architecture Guide", May 1999, p. 7-27.*
TMS32010 Users Guide, Digital Signal Processing Products, 1983, by Texas Instruments, p. 3-7.*
Motorola Inc., "PowerPC Microprocessor Family: The Programming Environments", 1994.
IBM, "PowerPC 740 and PowerPC 750 RISC Microprocessor Family User Manual", 1998.
MIPS Technologies, Inc., Silicon Graphics Introduces Enhanced MIPS® Architecture to Lead the Interactive Digital Revolution—Future Digital Media Processors Will Enable New World of High-Performance and Low-Cost Interactive Digital Applications, 1996.
Web Extension I: Survey of RISC Architectures.
MIPS V Instruction Set.
MIPS Extention for Digital Media with 3D.
IEEE, "Subword Parallelism With MAX-2", 1996.

* cited by examiner

HID2 register bit settings

| Bit(s) | Name | Description |
|---|---|---|
| 0 | LSQE | Load/Store quantized enable (non-indexed format)<br>0 psq_l[u] and psq_st[u] instructions are illegal<br>1 psq_l[u] and psq_st[u] instructions can be used |
| 1 | WBE | Write buffer enable<br>0 write buffer is disabled<br>1 write buffer enabled to gather non-cacheable data |
| 2 | PSE | Paired singles enabled<br>0 paired singles instructions are illegal<br>1 paired singles instructions can be used |
| 3 | LCE | Locked cache enable<br>0 Cache is not partitioned - 32 kB of normal cache<br>1 Cache is partitioned - 16 kB of normal cache and 16 kB of locked cache available |
| 4-7 | DMAQL | DMA queue length (read only)<br>the number of used queue positions in the DMA from 0 (queue empty) to 15 (queue full) |
| 8-31 | - | Reserved |

FIG. 4

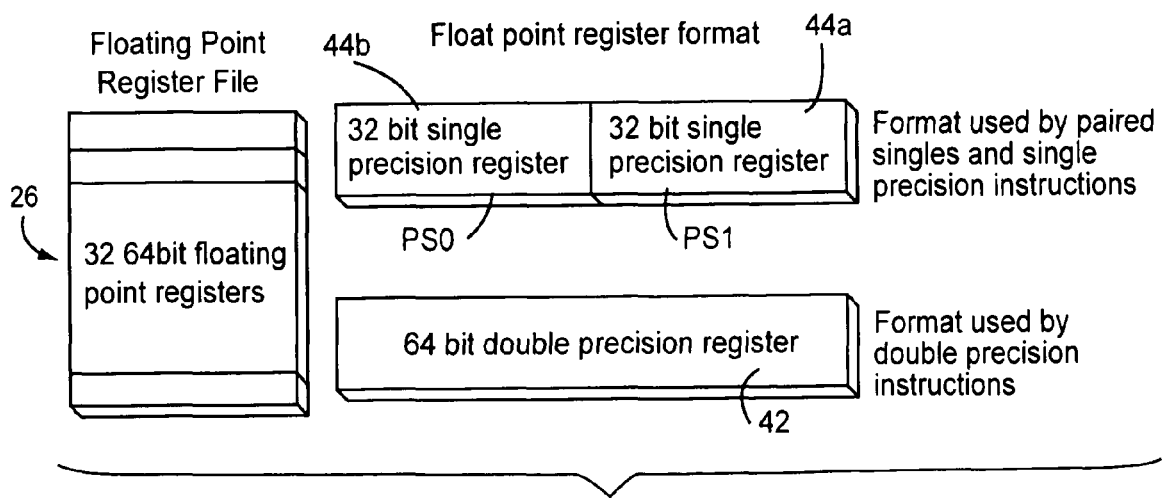

FIG. 5 ps_add*x*
Paired Single Add
ps_add      frD, frA, frB    (Rc=0)
ps_add.     frD, frA, frB    (Rc=1)

ps_madds0x
Paired Single Multiply-Add Scalar High
ps_madds0      frD, frA, frC, frB    (Rc=0)
ps_madds0.     frD, frA, frC, frB    (Rc=1)

| 4 | D | A | B | C | 14 | Rc |
|---|---|---|---|---|----|----|
| 0 | 5 6 | 10 11 | 15 16 | 20 21 | 25 26 | 30 31 | frD_ps0 = frA_ps0 * frC_ps0 + frB_ps0
frD_ps1 = frA_ps1 * frC_ps0 + frB_ps1

FIG. 8 ps_madds1x
Paired Single Multiply-Add Scalar Low
ps_madds1      frD, frA, frC, frB    (Rc=0)
ps_madds1.     frD, frA, frC, frB    (Rc=1)

| 4 | D | A | B | C | 15 | Rc |
|---|---|---|---|---|----|----|
| 0 | 5 6 | 10 11 | 15 16 | 20 21 | 25 26 | 30 31 | frD_ps0 = frA_ps0 * frC_ps1 + frB_ps0
frD_ps1 = frA_ps1 * frC_ps1 + frB_ps1

FIG. 9

METHOD AND APPARATUS FOR OBTAINING A SCALAR VALUE DIRECTLY FROM A VECTOR REGISTER

CROSS-REFERENCE TO RELATED APPLICATIONS

This application is a continuation of application Ser. No. 09/545,182, filed Apr. 7, 2000 now U.S. Pat. No. 6,857,061, the entire content of which is hereby incorporated by reference in this application.

This application is related to U.S. application Ser. No. 09/545,184, entitled "METHOD AND APPARATUS FOR SOFTWARE MANAGEMENT OF ON-CHIP CACHE" and U.S. application Ser. No. 09/545,183, entitled "METHOD AND APPARATUS FOR EFFICIENT LOADING AND STORING OF VECTORS", filed by the same inventors on the same date as the instant application. Both of these related cases are hereby incorporated by reference in their entirety.

FIELD OF THE INVENTION

This invention relates to information processors, such as microprocessors, and, more particularly, to a method and apparatus which improves the operational efficiency of information processors having a vector processing unit by enabling a scalar value to be directly selected from a vector register for use, for example, in a mixed vector and scalar operation.

BACKGROUND OF THE INVENTION

The electronic industry is in a state of evolution spurred by the seemingly unquenchable desire of the consumer for better, faster, smaller, cheaper and more functional electronic devices. In their attempt to satisfy these demands, the electronic industry must constantly strive to increase the speed at which functions are performed by data processors. Videogame consoles are one primary example of an electronic device that constantly demands greater speed and reduced cost. These consoles must be high in performance and low in cost to satisfy the ever increasing demands associated therewith. The instant invention is directed to increasing the speed at which a vector processing units of information processors can perform mathematical operations when a scalar is needed from a vector register to perform the operation.

Microprocessors typically have a number of execution units for performing mathematical operations. One example of an execution unit commonly found on microprocessors is a fixed point unit (FXU), also known as an integer unit, designed to execute integer (whole number) data manipulation instructions using general purpose registers (GPRs) which provide the source operands and the destination results for the instructions. Integer load instructions move data from memory to GPRs and store instructions move data from GPRs to memory. An exemplary GPR file may have 32 registers, wherein each register has 32 bits. These registers are used to hold and store integer data needed by the integer unit to execute integer instructions, such as an integer add instruction, which, for example, adds an integer in a first GPR to an integer in a second GPR and then places the result thereof back into the first GPR or into another GPR in the general purpose register file.

Another type of execution unit found on most microprocessors is a floating point unit (FPU), which is used to execute floating point instructions involving non-integers or floating point numbers. Floating point numbers are represented in the form of a mantissa and an exponent, such as $6.02 \times 10^3$. A floating point register file containing floating point registers (FPRs) is used in a similar manner as the GPRs are used in connection with the fixed point execution unit, as explained above. In other words, the FPRs provide source operands and destination results for floating point instructions. Floating point load instructions move data from memory to FPRs and store instructions move data from FPRs to memory. An exemplary FPR file may have 32 registers, wherein each register has 64 bits. These registers are used to hold and store floating point data needed by the floating point execution unit (FPU) to execute floating point instructions, such as a floating point add instruction, which, for example, adds a floating point number in a first FPR to a floating point number in a second FPR and then places the result thereof back into the first FPR or into another FPR in the floating point register file.

Microprocessor having floating point execution units typically enable data movement and arithmetic operations on two floating point formats: double precision and single precision. In the example of the floating point register file described above having 64 bits per register, a double precision floating point number is represented using all 64 bits of the FPR, while a single precision floating point number only uses 32 of the 64 available bits in each FPR. Generally, microprocessors having single precision capabilities have single precision instructions that use a double precision format.

For applications that perform low precision vector and matrix arithmetic, a third floating point format is sometimes provided which is known as paired singles. The paired singles capability can improve performance of an application by enabling two single precision floating point values to be moved and processed in parallel, thereby substantially doubling the speed of certain operations performed on single precision values. The term "paired singles" means that the floating point register is logically divided in half so that each register contains two single precision values. In the example 64-bit FPR described above, a pair of single precision floating point numbers comprising 32 bits each can be stored in each 64 bit FPR. Special instructions are then provided in the instruction set of the microprocessor to enable paired single operations which process each 32-bit portion of the 64 bit register in parallel. The paired singles format basically converts the floating point register file to a vector register file, wherein each vector has a dimension of two. As a result, part of the floating point execution unit becomes a vector processing unit (paired singles unit) in order to execute the paired singles instructions.

Some information processors, from microprocessors to supercomputers, have vector processing units specifically designed to process vectors. Vectors are basically an array or set of values. In contrast, a scalar includes only one value, such as a single number (integer or non-integer). A vector may have any number of elements ranging from 2 to 256 or more. Supercomputers typically provide large dimension vector processing capabilities. On the other hand, the paired singles unit on the microprocessor described above involves vectors with a dimension of only 2. In either case, in order to store vectors for use by the vector processing unit, vector registers are provided which are similar to those of the GPR and FPR register files as described above, except that the register size corresponds to the dimension of the vector on which the vector processing unit operates. For example, if the vector includes 64 values (such as integers or floating point numbers) each of which require 32 bits, then each vector register will have 2048 bits which are logically divided into 64 32-bit sections. Thus, in this example, each vector register is capable of storing a vector having a dimension of 64. FIG. 2 shows an exemplary vector register file 2 storing four 64 dimension vectors A, B, C and D.

A primary advantage of a vector processing unit with vector register as compared to a scalar processing unit with scalar registers is demonstrated with the following example: Assume vectors A and B are defined to have a dimension of 64, i.e. $A=(A_0 \ldots A_{63})$ and $B=(B_0 \ldots B_{63})$. In order to perform a common mathematical operation such as an add operation using the values in vectors A and B, a scalar processor would have to execute 64 scalar addition instructions so that the resulting vector would be $R=((A_1+B_1) \ldots (A_{63}+B_{63}))$. Similarly, in order to perform a common operation known as Dot_Product, wherein each corresponding value in vectors A and B are multiplied together and then each element in the resulting vector are added together to provide a resultant scalar, 128 scalar instructions would have to be performed (64 multiplication and 64 addition). In contrast, in vector processing a single vector addition instruction and a single vector Dot_Product instruction can achieve the same result. Moreover, each of the corresponding elements in the vectors can be processed in parallel when executing the instruction. Thus, vector processing is very advantageous in many information processing applications.

One problem, however, that is encountered in vector processing, is that sometimes it is desired to perform an operation using a scalar value contained within a vector register. For example, some applications may require mixed vector and scalar calculations, wherein the scalar needed (e.g. $C_{10}$) to perform the calculation is a single element within a particular vector (e.g. C) stored in a vector register. In other words, while a vector processing unit may easily execute a vector instruction which adds vector A to B and places the result in vector C (i.e. C=A+B), the vector processing unit cannot directly perform a mixed vector and scalar operation when the desired scalar is an element in a vector register (i.e. $D=C_{10}+A$). The primary reason for this limitation is that mixed scalar and vector instructions require that the scalar used in the operation be stored is a scalar register. In other words, such instructions do not have the ability to select a particular scalar element, such as $C_{10}$, from a vector register. FIG. 1 shows an exemplary format of prior art instructions for mixed scalar and vector instructions.

As can be seen in FIG. 1, the typical format for a mixed scalar and vector instruction 3 includes a primary op-code 4, a scalar register address 5, a vector register address 6 and a destination register address 7. The primary op-code identifies the particular type of instruction, such as vector-scalar multiplication, and may, for example, comprise the most significant 6 bits (bits 0-5) of the instruction. The scalar register address 5 provides the particular address of the register in the GPR file that contains the scalar value needed to execute the instruction. The vector register address 6 provides the particular address of the vector register in the vector register file which contains the vector needed to execute the instruction. The destination register address 7 provides the location for the result of the operation. It is noted that the instruction format 3 of FIG. 1 is only exemplary and that prior art instructions may have other formats and/or include other parts, such as a secondary op-code, status bits, etc., as one skilled in the art will readily understand. However, as explained above, regardless of the particular format of the instruction, the instruction still requires that a scalar register be used to store the scalar value needed to execute the instruction.

As a result, if the required scalar is a particular element of a vector register (e.g. $C_{10}$), the entire vector register must first be copied to memory in order to enable the desired scalar ($C_{10}$) to be loaded into a scalar register. In other words, the prior art provides no suitable mechanism for enabling a scalar to be used from a vector register. Thus, while such mixed scalar and vector instructions can be performed, they require significant overhead in terms of time required to store the vector to memory and load the scalar from memory to a scalar register, so that the scalar register contains the required scalar value to execute the instruction. Even assuming that the required vector is in a cache (high speed on-chip memory), thereby eliminating the need to access external memory, significant overhead still exists. For example, a typical cache may require approximately 30-50 CPU clock cycles (a time unit by which the central processing unit (CPU) operates) to load data from a 64-bit 128 dimension vector. Moreover, if cache is not available or if a cache miss occurs, the overhead would be approximately an order of magnitude higher to load or access the vector in an external memory as compared to a cache. Thus, large CPU cycle overhead is required to execute an instruction that, without the above limitations, could execute in for example, as fast as 10 clock cycles, i.e. 40 to 100 s of clock cycle overhead for a 10 cycle instruction.

Accordingly, a need exists for reducing the large overhead associated with such mixed scalar and vector instructions, so that the operations associated therewith can be performed faster and so that application performance can be improved.

SUMMARY OF THE INVENTION

The instant invention provides a mechanism and a method for enabling mixed scalar and vector instructions to run more efficiently and with less CPU cycle overhead by eliminating the need to load a value from a vector register into a scalar register in order to be used during execution of the instruction. The invention provides an improved instruction format which may be used in connection with any suitable type of data processor, from microprocessors to supercomputers, having a vector processing unit in order to improve the operational efficiency thereof.

In accordance with the invention, the improved instruction format has an embedded bit or a plurality of embedded bits that identify a particular element in a vector to be used as a scalar during execution of the instruction. In this way, a mixed scalar and vector instruction can be executed without the need to load the scalar operand into a scalar or general purpose register. By identifying, in the instruction, the location of the scalar in the vector, the scalar can be directly used from the vector register file for execution of the instruction.

In accordance with a preferred embodiment of the invention, the instruction format for mixed scalar and vector operations includes a primary op code, a first source vector register address, a second source vector register address, a destination register vector address, and at least one position bit which indicates the location of a desired scalar in one of the vector registers needed to execute the instruction. The number of bits needed to indicate the position of the desired scalar within a vector depends on the particular dimension of the vector involved. For example, if the vector has a dimension of 64, then six bits are needed to provide a unique identifier for the particular scalar within the vector. In other words, if the dimension of the vector is $2^n$, then n bits are needed, in this embodiment, to indicate the location of any scalar within the vector.

In another embodiment of the invention, the location of the scalar within the vector is determined based on the value of a secondary op code in the instruction. It is noted, however, that the invention is not limited to any particular implementation of the scalar position indicator in the instruction. Instead, the invention covers any suitable way in which the location of a scalar within the vector can be represented or embedded in the bit format comprising the instruction.

In a preferred embodiment, the invention is implemented on a microprocessor, such as the microprocessors in IBM's PowerPC (IBM Trademark) family of microprocessors (hereafter "PowerPC"), wherein the microprocessor has been modified or redesigned to include a vector processing unit, such as a paired singles unit. For more information on the PowerPC microprocessors see *PowerPC 740 and PowerPC 750 RISC Microprocessor Family User Manual, IBM* 1998 *and PowerPC Microprocessor Family: The Programming Environments*, Motorola Inc. 1994, both of which are hereby incorporated by reference in their entirety.

In the modified PowerPC example described above, the paired singles operation may be selectively enabled by, for example, providing a hardware implementation specific special purpose register (e.g. HID2) having a bit (e.g. $3^{rd}$ bit) which controls whether paired single instructions can be executed. Other bits in the special purpose register can be used, for example, to control other enhancement options that may be available on the microprocessor.

The invention also provides specific instruction definitions for mixed vector and scalar operations. The invention is also directed to a decoder, such as a microprocessor or a virtual machine (e.g. software implemented hardware emulator), which is capable of decoding any of all of these particular instructions disclosed herein. The invention further relates to a storage medium which stores any or all of the particular instructions disclosed herein.

BRIEF DESCRIPTION OF THE DRAWINGS

Other objects, features and advantages of the instant invention will become apparent upon review of the detailed description below when read in conjunction with the accompanying drawings, in which:

FIG. 4 is a table showing the definition of an exemplary special purpose register (HID2) used to control paired single operation of the vector processing unit, as well as other optional enhancements to the microprocessor of FIG. 3, in accordance with one embodiment of the instant invention;

FIG. 5 is an illustration of the floating point register file of the microprocessor of FIG. 3, wherein two possible floating point formats for the registers are shown;

FIGS. 8 and 9 show exemplary paired single instructions that enables a scalar to be directed used from a vector register, in accordance with a preferred embodiment of the instant invention.

DETAILED DESCRIPTION OF THE PREFERRED EMBODIMENTS

In the following description, numerous specific details are set forth regarding a preferred embodiment of the instant invention. However, the specific details are meant to be exemplary only and are not meant to limit the invention to the particular embodiment described herein. In other words, numerous changes and modifications may be made to the described embodiment without deviating from the true scope and spirit of the instant invention, as a person skilled in the art will readily understand from review of the description herein.

Figure 3:
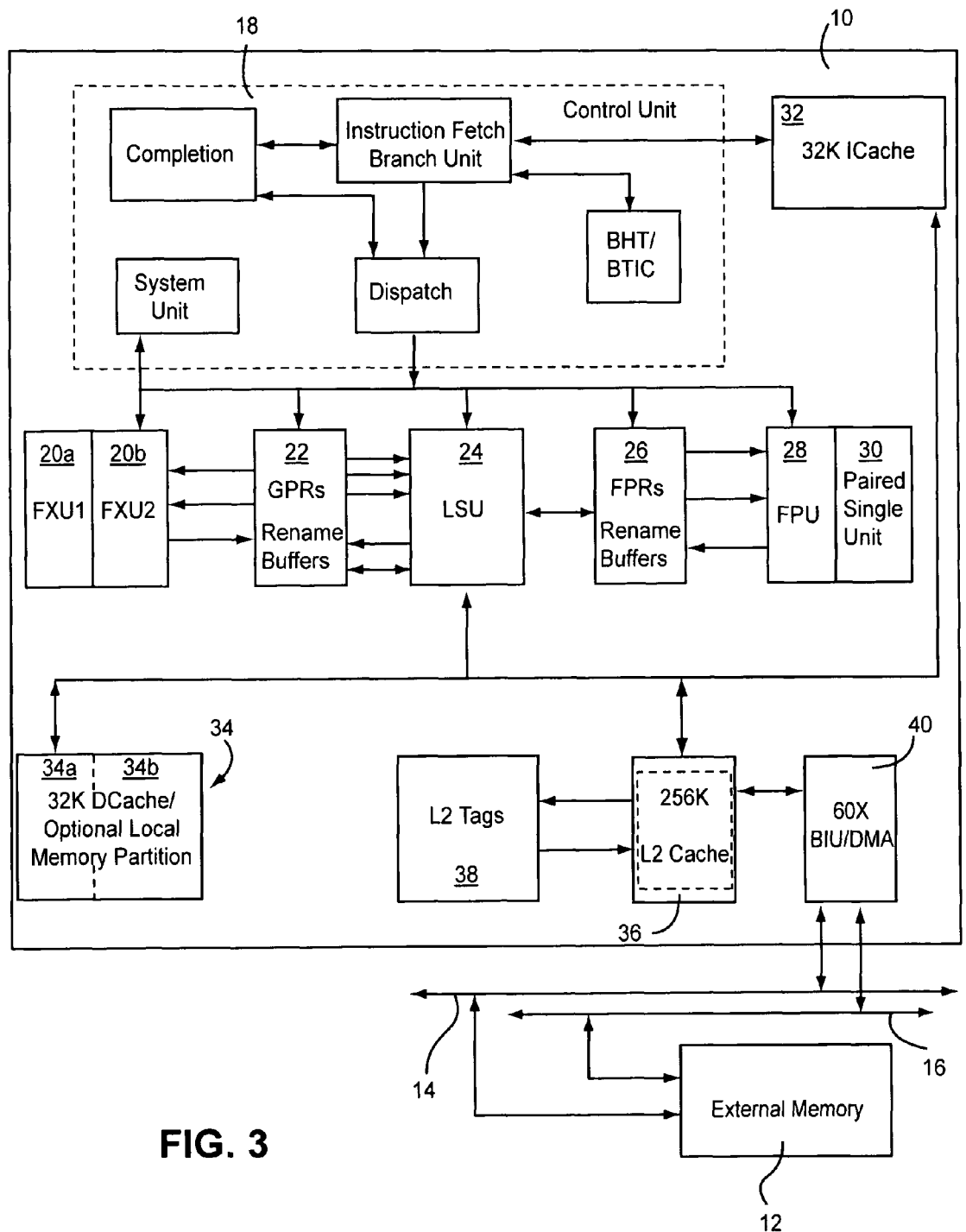
FIG. 3 shows an exemplary microprocessor and external memory which can be used to implement the instant invention.

FIG. 3 is a diagram of a single-chip microprocessor 10 in which the present invention has been implemented, in accordance with one exemplary embodiment of the instant invention. It is noted that FIG. 3 only shows a simplified representation of a microprocessor, due to that fact that the majority of the elements in the microprocessor, as well as their interconnection and operation, are well known to one skilled in the art. Thus, in order not to obscure the instant invention with details regarding known elements, the drawings and description herein are presented in a simplified form and only to the extent necessary to provide a full understanding of the instant invention for a person skilled in the art.

The microprocessor 10 is connected, in a known manner, to an off-chip (external) memory 12 or main memory via an address bus 14 and data bus 16. The external memory 12 contains data and/or instructions, such as 3D graphics instructions, needed by the microprocessor 10 in order perform desired functions. It is noted that the microprocessor 10 and external memory 12 may be implemented in a larger overall information processing system (not shown). The microprocessor includes a control unit 18, fixed point units 20a and 20b, general purpose registers (GPRs) 22, a load and store unit 24, floating point unit 28, paired single unit (vector processing unit) 30 and floating point registers 26, all of which generally interconnect and operate in a known manner. In addition, the microprocessor 10 includes a level one instruction cache 32, a level one data cache 34, a level two cache 36 with associated tags 38, and bus interface unit (BIU) 40, all of which may generally operate in a conventional manner. However, the data cache 34 and the direct memory access unit may have special operations as disclosed in copending U.S. patent application Ser. No. 09/545,184 entitled "Method and Apparatus for Software Management of On-Chip Cache" and filed concurrently herewith by the same inventors and assignees. For additional information on cache instructions for the PowerPC see *Zen and the Art of Cache Maintenance, Byte Magazine*, March 1997.

The structure and operation of this exemplary microprocessor 10 is similar to IBM's PowerPC microprocessors, with certain modifications to implement the instant invention. Details regarding the operation of most of the elements of this exemplary microprocessor are found in the following publications: *PowerPC 740 and PowerPC 750 RISC Microprocessor Family User Manual, IBM* 1998 *and PowerPC Microprocessor Family: The Programming Environments*, Motorola Inc. 1994. It is noted, however, that the instant invention may be implemented on any suitable data processor, from a microprocessor to a supercomputer, to improve vector operations using one or more scalar values contained in one or more vector registers.

As indicted above, this exemplary microprocessor 10 is an implementation of the PowerPC microprocessor family of reduced instruction set computer (RISC) microprocessors with extensions to improve the floating point performance, in accordance with the instant invention. The following provides a general overview of the operation of this exemplary microprocessor 10 and is not intended to limit the invention to any specific feature described.

The exemplary microprocessor 10 implements the 32-bit portion of the PowerPC architecture, which provides 32-bit effective addresses, integer data types of 8, 16, and 32 bits, and floating-point data types of single- and double-precision. In addition, the microprocessor extends the PowerPC architecture with the paired single-precision floating point data type and a set of paired single floating point instructions, as will be described in greater detail below. The microprocessor 10 is a superscalar processor that can complete two instructions simultaneously. It incorporates the following five main execution units: 1) floating-point unit (FPU) 28; 2) branch processing unit or control unit 18; 3) System register unit (SRU) (not shown); 4) Load/store unit (LSU) 24; and 5) Two integer units (FXUs) 20a and 20b, wherein FXU1 executes all integer instructions and FXU2 executes all integer instructions except multiply and divide instructions. The ability to execute several instructions in parallel and the use of simple instructions with rapid execution times yield high efficiency and throughput for systems using this exemplary microprocessor. Most integer instructions execute in one clock cycle. The FPU is preferably pipelined such that it breaks the tasks it performs into subtasks, and then executes in three successive stages. Typically, a floating-point instruction can occupy only one of the three stages at a time, freeing the previous stage to work on the next floating-point instruction. Thus, three single- or paired single-precision floating-point instructions can be in the FPU execute stage at a time. Double-precision add instructions have a three-cycle latency; double-precision multiply and multiply-add instructions have a four-cycle latency.

FIG. 3 shows the parallel organization of the execution units. The control unit 18 fetches, dispatches, and predicts branch instructions. It is noted that this is a conceptual model that shows basic features rather than attempting to show how features are implemented physically. The microprocessor 10 has independent on-chip, 32 Kbyte, eight-way set-associative, physically addressed caches for instructions and data and independent instruction and data memory management units. The data cache can be selectively configured as a four-way 16 KByte locked cache (software controlled) and a four-way 16 KByte normal cache. Each memory management unit has a 128-entry, two-way set-associative translation lookaside buffer that saves recently used page address translations. Block address translation (BAT) is done through four-entry instruction and data block address translation arrays, defined by the PowerPC architecture. During block translation, effective addresses are compared simultaneously with all four BAT entries. The L2 cache is implemented with an on-chip, two-way set-associative tag memory 38, and an on-chip 256 Kbyte SRAM 36 with ECC for data storage. The microprocessor 10 preferably has a direct memory access (DMA) engine to transfer data from the external memory 12 to the optional locked data cache 34b and to transfer data from the locked data cache to the external memory. A write gather pipe is preferably provided for efficient non-cacheable store operations.

The microprocessor 10 has a 32-bit address bus and a 64-bit data bus. Multiple devices compete for system resources through a central external arbiter. The microprocessor's three-state cache-coherency protocol (MEI) supports the modified, exclusive and invalid states, a compatible subset of the MESI (modified/exclusive/shared/invalid) four-state protocol, and it operates coherently in systems with four-state caches. The microprocessor supports single-beat and burst data transfers for external memory accesses and memory-mapped I/O operations.

In the exemplary embodiment of FIG. 3, the microprocessor includes separate 32-Kbyte, eight-way associative instruction and data caches (32 and 34) to allow the various execution units (18, 20a, 20b, 28 and 30) and registers rapid access to instructions and data, thereby reducing the number of relatively slow accesses to the external memory 12. The caches preferably implement a pseudo least-recently-used (PLRU) replacement algorithm for managing the contents of the caches. The cache directories are physically addressed, the physical (real) address tag being stored in the cache directory. Both the instruction and data caches have 32-byte cache block size, wherein a cache block is the block of memory that a coherency state describes (also referred to as a cache line). Two coherency state bits for each data cache block allow encoding for three states—Modified (exclusive) (M), Exclusive (unmodified) (E), and Invalid (I)—thereby defining an MEI three-state cache coherency protocol. A single coherency state bit for each instruction cache block allows encoding for two possible states: invalid (INV) or Valid (VAL). In accordance with the instant invention, each cache can be invalidated or locked by setting the appropriate bits in a hardware implementation-dependent register (a special purpose register described in detail below).

The microprocessor 10 preferably supports a fully-coherent 4-Gbyte physical address space. Bus snooping is used to drive the MEI three-state cache coherency protocol that ensures the coherency of global memory with respect to the processor's data cache. The data cache 34 coherency protocol is a coherent subset of the standard MESI four-state cache protocol that omits the shared state. The data cache 34 characterizes each 32-byte block it contains as being in one of three MEI states. Addresses presented to the cache are indexed into the cache directory with bits A(20-26), and the upper-order 20 bits from the physical address translation (PA(0-19)) are compared against the indexed cache directory tags. If neither of the indexed tags matches, the result is a cache miss (required data not found in cache). On a cache miss, the microprocessor cache blocks are filled in four beats of 64 bits each. The burst fill is performed as a critical-double-word-first operation—the critical double word is simultaneously written to the cache and forwarded to the requesting unit, thus minimizing stalls due to cache fill latency. If a tag matches, a cache hit occurred and the directory indicates that state of the cache block through two state bits kept with the tag. The microprocessor 10 preferably has dedicated hardware to provide memory coherency by snooping bus transactions.

Both caches 32 and 34 are preferably tightly coupled into the bus interface unit (BUI) 40 to allow efficient access to the system memory controller and other potential bus masters. The BUI 40 receives requests for bus operations from the instruction and data caches, and executes operations per the 60x bus protocol. The BUI 40 provides address queues, prioritizing logic and bus control logic. The BUI also captures snoop addresses for data cache, address queue and memory reservation operations. The data cache is preferably organized as 128 sets of eight ways, wherein each way consists of 32 bytes, two state bits and an address tag. In accordance with the instant invention, an additional bit may be added to each cache block to indicate that the block is locked. Each cache block contains eight contiguous words from memory that are loaded from an eight-word boundary (i.e., bits A(27-31) of the logical (effective) addresses are zero). As a result, cache blocks are aligned with page boundaries. Address bits A(20-26) provide the index to select a cache set. Bits A(27-31) select a byte within a block. The on-chip data cache tags are single ported, and load or store operations must be arbitrated with snoop accesses to the data cache tags. Load and store operations can be performed to the cache on the clock cycle immediately following a snoop access if the snoop misses.

Snoop hits may block the data cache for two or more cycles, depending on whether a copy-back to main memory 12 is required.

The level one (L1) caches (32 and 34) are preferably controlled by programming specific bits in a first special purpose register (HID0—not shown) and by issuing dedicated cache control instructions. The HID0 special purpose register preferably contains several bits that invalidate, disable, and lock the instructions and data caches. The data cache 34 is automatically invalidated when the microprocessor 10 is powered up and during a hard reset. However, a soft reset does not automatically invalidate the data cache. Software uses the HID0 data cache flash invalidate bit (HID0(DCFI)) if the cache invalidation is desired after a soft reset. Once the HID0 (DCFI) is set through move-to-special-purpose-register (mtspr) operation, the microprocessor automatically clears this bit in the next clock cycle (provided that the data cache is enabled in the HID0 register).

The data cache may be enabled or disabled by using the data cache enable bit (HID0(DCE)) which is cleared on power-up, disabling the data cache. When the data cache is in the disabled state (HID0(DCE)=0), the cache tag state bits are ignored, and all accesses are propagated to the L2 cache 36 or 60× bus as single beat transactions. The contents of the data cache can be locked by setting the data cache lock bit (HID0 (DLOCK)). A data access that hits in a locked data cache is serviced by the cache. However, all accesses that miss in the locked cache are propagated to the L2 cache 36 or 60× bus as single-beat transactions. The microprocessor 10 treats snoop hits in the locked data cache the same as snoop hits in an unlocked data cache. However, any cache block invalidated by a snoop remains invalid until the cache is unlocked. The instruction cache 32 operates in a similar manner as the data cache described above, except that different bits are used in the HID0 register for invalidation and locking, i.e. instruction cache flash invalidate bit HID0(ICFI) and instruction cache lock bit HID0(ILOCK).

Figures 1, 2:
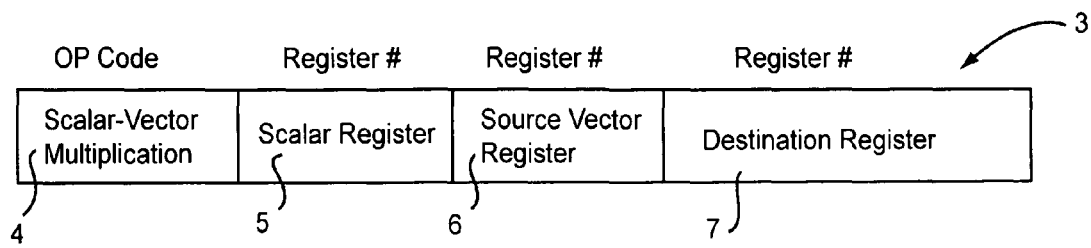
FIG. 1 shows a format of a conventional instruction which performs a mathematical operation involving a scalar and vector.
FIG. 2 shows an exemplary representation of a vector register file.

The microprocessor 10 preferably includes another hardware implementation-dependent special purpose register (HID2) that, in accordance with the instant invention, is used to enable the floating point unit to operate in paired singles mode, i.e. enables the 64-bit FPRs to be treated as a pair of 32-bit registers containing two single precision floating point numbers. Specifically, the HID2 register contains a paired singles enable bit (PSE) that is used to enable paired singles operation. An example definition for the HID2 register is shown in FIG. 4, wherein bit number 2 is the PSE bit for controlling paired single format. The other bits in the HID2 register are used to control other enhanced features that may be provided in the microprocessor 10, such as data quantization, locked cache, write buffering, and DMA queue length as shown on FIG. 4. It is noted that, while FIG. 2 shows that bits 8-31 of the HID2 register are reserved, these bits may be used to indicate, for example, cache instruction hit error, DMA access to normal cache error, DMA cache miss error, DMA queue length overflow error, instruction cache hit error enable, DMA cache miss error enable, and DMA queue overflow error enable.

When the HID2(PSE) bit is set to 1, paired singles instructions can be used. Thus, the floating point unit 28 of microprocessor 10 includes a paired singles unit 30 for processing the two dimensional vectors defined by paired singles. In other words, the microprocessor 10 has the ability to perform vector processing as described above, wherein the dimension of the vector is two. A floating point status and control register (FPSCR) is also provided which contains floating point exception signal bits, exception summary bits, exception enable bits, and rounding control bits needed for compliance with the IEEE standard.

Figure 7:
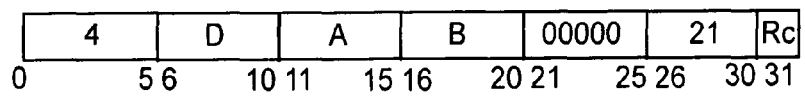
FIG. 7 shows an exemplary paired single instruction format which only uses vectors.

Thus, in addition to single- and double-precision operands, when HID2(PSE)=1, the microprocessor 10 supports a third format: paired singles. As shown in FIG. 5, the 64-bit registers in the floating point register file 26, which typically are treated as a single 64-bit register 42, are converted to a pair of 32 bit registers 44a and 44b each being operable to store a single precision (32-bit) floating point number. The single-precision floating point value in the high order word is referred to herein as ps0, while the single-precision floating point value in the low order word is referred to herein as ps1. Special instructions are provided in the instruction set of the microprocessor 10 for manipulating these operands which allow both values (ps0 and ps1) be processed in parallel in the paired singles unit 30. For example, a paired single multiply-add instruction (ps4_-madd) instruction may be provided that multiplies ps0 in frA by ps0 in frC, then adds it to ps0 in frB to get a result that is placed in ps0 in frD. Simultaneously, the same operations are applied to the corresponding ps1 values. Paired single instructions may be provided which perform an operation comparable to one of the existing double-precision instructions in provided in the PowerPc instruction set. For example, a fadd instruction adds double-precision operands from two registers and places the result into a third register. In the corresponding paired single instruction, ps_add, two such operations are performed in parallel, one on the ps0 values, and one on the ps1 values. An exemplary format for a ps_add instruction format is shown in FIG. 7, wherein the instruction includes 32 bits, and further wherein bits 0-5 encode a primary op code of 4, bits 6-10 designate a floating point destination register for storing a pair of 32-bit single-precision floating point values resulting from the paired single floating point add instruction, bits 11-15 designate a floating point source register storing a pair of 32-bit single-precision floating point values, bits 16-20 designate a further floating point source register storing a pair of 32-bit single-precision floating point values, bits 21-25 encode a reserved field of "00000", bits 26-30 encode a secondary op code of 21, and bit 31 comprises a record bit indicating updating of a condition register.

Most paired single instructions produce a pair of result values. The Floating-Point Status and Control Register (FPSCR) contains a number of status bits that are affected by the floating-point computation. FPSCR bits 15-19 are the result bits. They may be determined by the result of the ps0 or the ps1 computation. When in paired single mode (HID2 (PSE)=1), all the double-precision instructions are still valid, and execute as in non-paired single mode. In paired single mode, all the single-precision floating-point instructions) are valid, and operate on the ps0 operand of the specified registers.

In accordance with an important aspect of the instant invention, special paired single instructions are provided which involve a combination of vector and scalar values without requiring that the scalar value be moved or located in a scalar register in order to execute the instructions. More particularly, in accordance with the invention, the location of the scalar within the vector is provided in the instruction itself, thereby enabling the desired scalar to be directly used from the vector.

FIGS. 8 and 9 show two exemplary instructions for performing mixed vector and scalar operations, in accordance with the instant invention. FIG. 8 is a paired-single-multiply-scalar-high instruction called ps_madds0x. This instruction is a paired single instruction which performs a scalar-vector multiply-add operation using ps0 (the high order word or first single-precision value of the register) as the scalar. The ps_madds0x instruction includes 32 bits, wherein bits 0-5 encode a primary op code of 4, bits 6-10 designate a floating point destination register for storing the results of the instruction, bits 11-15 designate a first floating point register as a first source storing a first pair of 32-bit single-precision floating point values, bits 16-20 designate a second floating point register as a second source storing a second pair of 32-bit single-precision floating point values, bits 21-25 designate a third floating point register as a third source storing a third pair of 32-bit single-precision floating point values, bits 26-30 encode a secondary op code of 14 and bit 31 comprises a record bit indicating updating of a condition register. In this exemplary instruction, the location of the scalar to be used is determined by the secondary op code, indicates, among other things, that ps0 is be used as the scalar. In other words, the position of the scalar is embedded in the secondary op code.

As can be seen in FIG. 8, in accordance with this ps-madds0x instruction, the floating-point operand in register frA(ps0) is multiplied by the floating-point operand in register frC(ps0). Then, the floating-point operand in register frB (ps0) is added to this intermediate result. If the most-significant bit of the resultant significand is not a one, the result is normalized. The result is then rounded to single-precision under control of a floating-point rounding control field RN of the FPSCR and is placed into frD(ps0). In addition, the floating-point operand in register frA(ps1) is multiplied by the floating-point operand in register frC(ps0). Then, the floating-point operand in register frB (ps1) is added to this intermediate result. If the most-significant bit of the resultant significand is not a one, the result is normalized. The result is then rounded to single-precision under control of the floating-point rounding control field RN of the FPSCR and is placed into frD(ps1). FPSCR(FPRF) is set to the class and sign of the ps0 result, except for invalid operation exceptions when FPSCR(VE)=1.

FIG. 9 is a paired-single-multiply-scalar-low instruction called ps_madds1x. This instruction is a paired single instruction which performs a scalar-vector multiply-add operation using ps1 (the low order word or second single-precision value of the register) as the scalar. The ps_madds1x instruction includes 32 bits, wherein bits 0-5 encode a primary op code of 4, bits 6-10 designate a floating point destination register for storing the results of the instruction, bits 11-15 designate a first floating point register as a first source storing a first pair of 32-bit single-precision floating point values, bits 16-20 designate a second floating point register as a second source storing a second pair of 32-bit single-precision floating point values, bits 21-25 designate a third floating point register as a third source storing a third pair of 32-bit single-precision floating point values, bits 26-30 encode a secondary op code of 15 and bit 31 comprises a record bit indicating updating of a condition register. In this exemplary instruction, the location of the scalar to be used is determined by the secondary op code, indicates, among other things, that ps1 is be used as the scalar. In other words, the position of the scalar is embedded in the secondary op code.

As can be seen in FIG. 9, in accordance with this ps-madds1x instruction, the floating-point operand in register frA(ps0) is multiplied by the floating-point operand in register frC(ps1). The floating-point operand in register frB(ps0) is then added to this intermediate product. If the most-significant bit of the resultant significand is not a one, the result is normalized. The result is then rounded to single-precision under control of the floating-point rounding control field RN of the FPSCR and placed into frD(ps0). In addition, the floating-point operand in register frA(ps1) is multiplied by the floating-point operand in register frC(ps1). The floating-point operand in register frB(ps1) is then added to this intermediate product. If the most-significant bit of the resultant significand is not a one, the result is normalized. The result is then rounded to single-precision under control of the floating-point rounding control field RN of the FPSCR and placed into frD(ps1). FPSCR(FPRF) is set to the class and sign of the ps0 result, except for invalid operation exceptions when FPSCR(VE)=1.

It is noted that in each of the examples provided above for mixed vector and scalar instructions, the secondary op code is used to indicate the particular scalar intended for use by the instruction. However, this implementation is only exemplary and was selected in this embodiment due to the fact that the microprocessor 10 is based on the PowerPC microprocessor. Thus, embedding of the location of the scalar in the secondary op code is used in this example because it was the most convenient way of implementing the invention based on the existing circuitry found in the PowerPC. Thus, depending of the particular implementation of the invention, the manner and location in which the scalar location is embedded in the instruction may change. In other words, the scalar location may take any suitable form in the instruction, as long as the decoder thereof can identify the scalar within the vector needed to execute the instruction.

Figure 6:
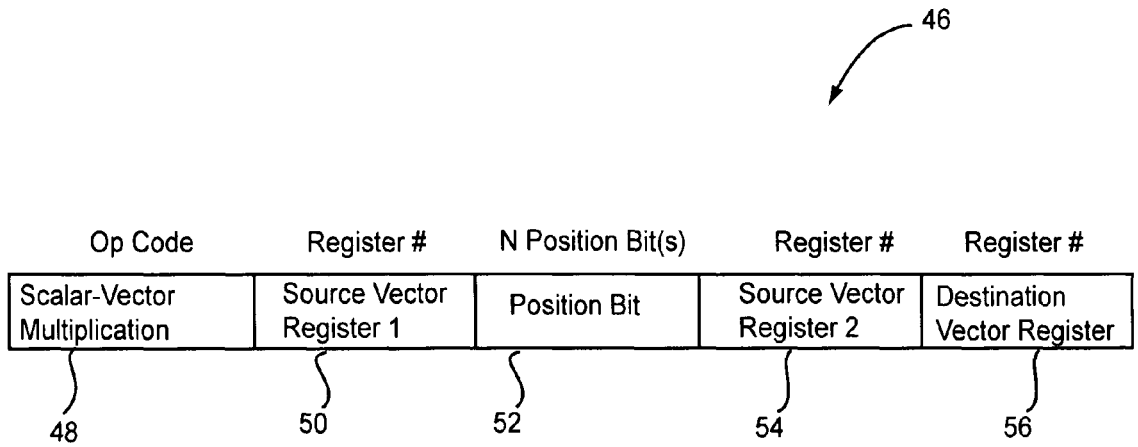
FIG. 6 shows a preferred embodiment of the format for an instruction used to obtain a scalar value directly from a vector register, in accordance with the instant invention.

While the above embodiment of the invention describes a particular microprocessor implementation of the instant invention, the invention is in now way limited to use in a microprocessor environment. In fact, the invention is applicable to any data processor, from microprocessors to supercomputers, that includes a vector processing unit, regardless of the dimension of the vectors operated thereon. FIG. 6 shows an exemplary general format for a mixed vector and scalar instruction 46 in accordance with the instant invention. As shown in FIG. 6, this general bit format includes a primary op code 48, a first source vector register location 50, position bit(s) 52, a second source vector register location 54, and a destination vector register location 56. Thus, when FIG. 6 is compared to FIG. 1, a major advantage of the instant invention can be seen, i.e. the exemplary instruction format of the instant invention (FIG. 6) does not need to have the scalar value in a scalar register as required by the prior art instruction format (see element 5 of FIG. 1). Thus, in accordance with the instant invention, the need to store the vector register in memory (or cache) and to load the scalar value from the stored vector into a scalar register has been eliminated. In other words, the improved format of FIG. 6 enables a mixed scalar and vector operation to be performed using only the vectors stored in the vector registers, by using the information in the position bit(s) to identify the location of the desired scalar in the vector register.

In accordance with the invention, the number of bits needed to indicate the position of the desired scalar within a vector depends on the particular dimension of the vector involved. For example, if the vector has a dimension of 64, then six bits are needed to provide a unique identifier for the particular scalar within the vector. In other words, if the dimension of the vector is $2^n$, then n bits are needed, in this embodiment, to indicate the location of any scalar within the vector.

In accordance with the invention other mixed vector and scalar instructions may be used which embed the location of the desired scalar in the bits of the instruction. For example, scalar-vector multiply instructions may be used, wherein the bits in the instructions, such as the bits comprising the secondary op code, indicate whether ps0 or ps1 is to be used as the scalar, e.g. ps_muls0x and ps_muls1x instructions.

A main difference between the instructions of FIGS. 8 and 9 and that of FIG. 6, is that, in FIGS. 8 and 9, the position bits are basically embedded in the secondary op code. In contrast, in the format of FIG. 6, certain dedicated bits 52 (N position bits) are used to identify the location of the scalar within the vector. It is noted, however, that the invention is not limited to either of these approaches and may be implemented by using any bits in the instruction to identify the location of the scalar within the vector. In other words, the invention covers any type of embedding of the position bit in the instruction regardless of the particular location or format of the position bit(s) or the instruction. The invention may also be implemented in an type of vector processing unit regardless of the type of date for which the unit is designed. For example, the invention may be used for integer vectors as well as for floating point vectors.

In accordance with a preferred embodiment of the microprocessor of FIG. 3, in order to move data efficiently between the CPU and memory subsystems, certain load and store instructions can preferably implicitly convert their operands between single precision floating point and lower precision, quantized data types. Thus, in addition to the floating-point load and store instructions defined in the PowerPC architecture, the microprocessor 10 preferably includes eight additional load and store instructions that can implicitly convert their operands between single-precision floating-point and lower precision, quantized data types. For load instructions, this conversion is an inverse quantization, or dequantization, operation that converts signed or unsigned, 8 or 16 bit integers to 32 bit single-precision floating-point operands. This conversion takes place in the load/store unit 24 as the data is being transferred to a floating-point register (FPR). For store instructions, the conversion is a quantization operation that converts single-precision floating-point numbers to operands having one of the quantized data types. This conversion takes place in the load/store unit 24 as the data is transferred out of an FPR. The load and store instructions for which data quantization applies are for paired single operands, and so are valid only when HID2(PSE)=1. These new load and store instructions cause an illegal instruction exception if execution is attempted when HID2(PSE)=0. Furthermore, the nonindexed forms of these loads and stores (psq_1(u) and psq_st(u)) are illegal unless HID2(LSQE)=1 as well (see FIG. 4). The quantization/dequantization hardware in the load/store unit assumes big-endian ordering of the data in memory. Use of these instructions in little-endian mode will give undefined results. Whenever a pair of operands are converted, they are both converted in the same manner. When operating in paired single mode (HID2(PSE)=1), a single-precision floating-point load instruction will load one single-precision operand into both the high and low order words of the operand pair in an FPR. A single-precision floating-point store instruction will store only the high order word of the operand pair in an FPR. preferably, two paired single load (psq_1, psq_1u) and two paired single store (psq_st, psq_stu) instructions use a variation of the D-form instruction format. Instead of having a 16 bit displacement field, 12 bits are used for displacement, and the remaining four are used to specify whether one or two operands are to be processed (the 1 bit W field) and which of eight general quantization registers (GQRs) is to be used to specify the scale and type for the conversion (a 3 bit I field). Two remaining paired single load (psq_1x, psq_1ux) and the two remaining paired single store (psq_stx, psq_stux) instructions use a variation of the X-form instruction format. Instead of having a 10 bit secondary op code field, 6 bits are used for the secondary op code, and the remaining four are used for the W field and the I field.

An exemplary dequantization algorithm used to convert each integer of a pair to a single-precision floating-point operand is as follows:
1. read integer operand from L1 cache;
2. convert data to sign and magnitude according to type specified in the selected GQR;
3. convert magnitude to normalized mantissa and exponent;
4. subtract scaling factor specified in the selected GQR from the exponent; and
5. load the converted value into the target FPR.

For an integer value, I, in memory, the floating-point value F, loaded into the target FPR, is $F=I*2**(-S)$, where S is the twos compliment value in the LD_SCALE field of the selected GQR. For a single-precision floating-point operand, the value from the L1 cache is passed directly to the register without any conversion. This includes the case where the operand is a denorm.

An exemplary quantization algorithm used to convert each single-precision floating-point operand of a pair to an integer is as follows:
1. move the single-precision floating-point operand from the FPR to the completion store queue;
2. add the scaling factor specified in the selected GQR to the exponent;
3. shift mantissa and increment/decrement exponent until exponent is zero;
4. convert sign and magnitude to 2 s complement representation;
5. round toward zero to get the type specified in the selected GQR;
6. adjust the resulting value on overflow; and
7. store the converted value in the L1 cache.

The adjusted result value for overflow of unsigned integers is zero for negative values, 255 and 65535 for positive values, for 8 and 16 bit types, respectively. The adjusted result value for overflow of signed integers is −128 and −32768 for negative values, 127 and 32767 for positive values, for 8 and 16 bit types, respectively. The converted value produced when the input operand is +Inf or NaN is the same as the adjusted result value for overflow of positive values for the target data type. The converted value produced when the input operand is −Inf is the same as the adjusted result value for overflow of negative values. For a single-precision floating-point value, F, in an FPR, the integer value I, stored to memory, is I=ROUND $(F*2**(S))$, where S is the twos compliment value in the ST_SCALE field of the selected GQR, and ROUND applies the rounding and clamping appropriate to the particular target integer format. For a single-precision floating-point operand, the value from the FPR is passed directly to the L1 cache without any conversion, except when this operand is a denorm. In the case of a denorm, the value 0.0 is stored in the L1 cache.

It is noted that the above data quantization feature is only optional and exemplary in accordance with the instant invention. However, its use can further improve the operation of the microprocessor 10 for certain applications.

In accordance with a further aspect of the invention, the microprocessor 10 is considered to be a decoder and executor for the particular instructions described herein. Thus, part of the instant invention involves providing an instruction decoder and executor for the new instructions defined in the above description of the invention. The invention, however, is not limited to a hardware decoder or executor, such as a microprocessor, but also covers software decoders and executors provided by, for example, a virtual machine, such as a software emulator of the instant microprocessor. In other words, the invention also relates to software emulators that emulate the operation of the instant microprocessor by decoding and executing the particular instructions described herein. The invention further relates to a storage medium, such as a compact disk which stores any or all of the unique instructions described herein, thereby enabling a microprocessor or virtual machine to operate in accordance with the invention described herein.

As can be seen from the description above, the instant invention enables fast and efficient processing of mixed vector and scalar operations in a vector processing environment, thereby reducing the overhead and improving the speed at which these and similar instructions can be executed by a vector processing unit, such as a paired singles unit or any other vector processor operating on vectors with any dimension. It is noted that the instant invention is particularly advantageous when implemented in low cost, high performance microprocessors, such as microprocessors designed and intended for use in videogame consoles for household use or the like.

While the preferred forms and embodiments have been illustrated and described herein, various changes and modification may be made to the exemplary embodiment without deviating from the scope of the invention, as one skilled in the art will readily understand from the description herein. Thus, the above description is not meant to limit the scope of the appended claims beyond the true scope and sprit of the instant invention as defined herein.

What is claimed is:

1. A method of obtaining a scalar value from a vector register for use in a mixed vector and scalar instruction, the method comprising:

providing a vector in a vector register file; and embedding a location identifier of the scalar value within the vector in bits comprising the mixed vector and scalar instruction, wherein the mixed vector and scalar instruction is defined according to an instruction format, the instruction format comprising an op code, a first source vector register address, a second source vector register address, a destination vector register address, and at least one dedicated position bit that indicates the location of the scalar value within one of the vector registers, and further comprising:

defining the mixed scalar and vector instruction such that the at least one dedicated position bit is provided in a bit format of the instruction which provides the location identifier of the scalar value within the vector, and embedding the location identifier in the op code provided in the instruction.

2. The method of claim 1, wherein a dimension of the vector is $2^n$, and further including providing n bits in the bit format for indicating the location of the scalar value within the vector.

3. The method of claim 1, further including embedding the location identifier in a secondary op code provided in the instruction.

4. The method of claim 1, further including using the instruction in a data processor having a paired singles execution unit, wherein two single precision values constitute the vector.

5. The method of claim 1, wherein the vector has a dimension of two.

6. The method of claim 1, wherein the vector processing unit is a paired singles unit which processes two single-precision floating point values in parallel.

7. The method of claim 1, wherein the mixed scalar and vector instruction corresponds to a graphics-related instruction.

8. The method of claim 1, further comprising loading the scalar value to be processed from the vector without using a scalar or general purpose register.

9. The method of claim 1, further comprising executing the mixed scalar and vector instruction without loading the scalar value into a scalar or general purpose register, the scalar value corresponding to a scalar operand.

10. A data processor, comprising a vector processing unit, a vector register file and an instruction set, wherein the instruction set includes at least one mixed vector and scalar instruction having a bit format in which a location of a scalar value within a vector needed to execute the instruction is embedded, the processor being configured to execute the method of claim 1.

11. The data processor of claim 10, wherein the location of the scalar value is embedded in a secondary op code of the instruction.

12. The data processor of claim 10, wherein the vector has a dimension of $2^n$ and n dedicated bits are provided in the instruction to provide the location of the scalar value within the vector.

13. The data processor of claim 10, wherein the mixed scalar and vector instruction specifies vector registers for all operands needed to execute the instruction.

* * * * *